US011943517B2

(12) United States Patent
Calvert

(10) Patent No.: US 11,943,517 B2
(45) Date of Patent: Mar. 26, 2024

(54) METHOD AND APPARATUS FOR REMOTELY TUNING CHANNELS USING DLNA DMS SERVICE

(75) Inventor: Kerry Wayne Calvert, Indianapolis, IN (US)

(73) Assignee: InterDigital Madison Patent Holdings, SAS, Paris (FR)

( * ) Notice: Subject to any disclaimer, the term of this patent is extended or adjusted under 35 U.S.C. 154(b) by 59 days.

(21) Appl. No.: 13/995,334

(22) PCT Filed: Jan. 3, 2012

(86) PCT No.: PCT/US2012/020021
§ 371 (c)(1), (2), (4) Date: Jun. 18, 2013

(87) PCT Pub. No.: WO2012/094279
PCT Pub. Date: Jul. 12, 2012

(65) Prior Publication Data

US 2013/0276043 A1 Oct. 17, 2013

Related U.S. Application Data

(60) Provisional application No. 61/429,550, filed on Jan. 4, 2011.

(51) Int. Cl.
*H04N 21/858* (2011.01)
*H04L 12/28* (2006.01)
(Continued)

(52) U.S. Cl.
CPC ..... *H04N 21/8586* (2013.01); *H04L 12/2805* (2013.01); *H04L 65/611* (2022.05); *H04L 65/612* (2022.05); *H04L 65/765* (2022.05)

(58) Field of Classification Search
CPC ............ H04L 12/2805; H04L 65/4076; H04L 65/4084; H04L 65/605; H04L 67/02;
(Continued)

(56) References Cited

U.S. PATENT DOCUMENTS 6,215,530 B1 4/2001 Wasilewski
6,621,528 B1 * 9/2003 Kessler ............... H04N 5/4401 348/734
(Continued)

FOREIGN PATENT DOCUMENTS

CN 101878644 A 11/2010
EP 2482555 A2 1/2012
(Continued)

OTHER PUBLICATIONS

D-Bus integration in Emacs; Copyright ©2007-2013 Free Software Foundation, Inc.*
(Continued)

*Primary Examiner* — Kunal Langhnoja
(74) *Attorney, Agent, or Firm* — CONDO ROCCIA KOPTIW LLP

(57) ABSTRACT

A particular implementation correlates a broadcast media item, which has a metadata element containing either a station call sign or channel number for a program, to a specific broadcast frequency and a virtual channel that a service provider broadcasts the program on. A command string is algorithmically defined to encode the frequency and physical channel, and is presented to the tuner hardware for locking onto and decoding the signal. A URL including the command string can then be generated. Consequently, a DLNA client device can engage a media renderer to play the broadcast media item through the exchange of a URL and a control interface.

20 Claims, 3 Drawing Sheets

10

Correlating a media item and its broadcast frequency/virtual channel (for example building cross-reference table that correlates DVB triplet information and the user selected channel) — 12

Encoding a URL with information corresponding to the correlated media item — 14

Forward (encoded) URL to DLNA client — 16

Presenting the URL to HTTP service specified in the URL, and performing playback — 18

(51) Int. Cl.
*H04L 65/611* (2022.01)
*H04L 65/612* (2022.01)
*H04L 65/75* (2022.01)

(58) Field of Classification Search
CPC ............... H04N 21/8586; H04N 21/21; H04N 21/2225; H04N 21/23; H04N 21/234327; H04N 21/2393; H04N 21/2668; H04N 21/47202; H04N 21/4722; H04N 21/6587; H04N 7/17318; H04N 21/235; H04N 21/2362; H04N 21/42638; H04N 21/4383; H04N 21/482
USPC ..... 725/25, 30, 38–39, 48, 74, 91, 103, 110, 725/153
See application file for complete search history.

(56) References Cited

U.S. PATENT DOCUMENTS 8,245,265 B2 8/2012 Yoon et al.
2003/0233451 A1* 12/2003 Ludvig .............. H04N 21/2221 709/225
2005/0108766 A1* 5/2005 Hlasny .............. H04L 29/06027 725/100
2006/0136549 A1* 6/2006 Carro ..................... H04H 60/40 709/203
2007/0055998 A1* 3/2007 Kang et al. ..................... 725/81
2007/0124786 A1 5/2007 Kim et al.
2007/0288505 A1 12/2007 Kato et al.
2008/0022334 A1 1/2008 Ushimaru et al.
2008/0141323 A1* 6/2008 Munetsugu ......... H04L 12/2805 725/115
2008/0172712 A1* 7/2008 Munetsugu .......... H04N 7/1675 725/118
2008/0250101 A1* 10/2008 Tanaka ................. G11B 27/005 709/203
2008/0250461 A1* 10/2008 Tanaka et al. .................. 725/74
2009/0094646 A1 4/2009 Walter et al.
2009/0099858 A1 4/2009 Jeffs
2009/0106801 A1* 4/2009 Horii ...................... H04N 5/775 725/91
2009/0178077 A1* 7/2009 Kim ................... H04N 5/44543 725/39
2009/0193101 A1* 7/2009 Munetsugu .......... G11B 27/034 709/219
2009/0193469 A1* 7/2009 Igarashi ............. H04N 7/17309 725/56
2009/0260042 A1 10/2009 Chiang
2010/0262674 A1* 10/2010 Tanaka ............... H04N 21/4325 709/217
2011/0176555 A1* 7/2011 Poder .................... H04L 65/605 370/463
2012/0011557 A1* 1/2012 Mathews ......... H04N 21/25833 725/131
2012/0174163 A1* 7/2012 Moorthy ............ H04N 21/4227 725/56
2017/0150232 A1 5/2017 Simoes Rodrigues et al.

FOREIGN PATENT DOCUMENTS

| | | |
|---|---|---|
| JP | 2004165729 | 6/2004 |
| JP | 2004320752 | 11/2004 |
| JP | 2005109637 | 4/2005 |
| JP | 2006129183 | 5/2006 |
| JP | 2007318365 | 12/2007 |
| JP | 2008017136 | 1/2008 |
| JP | 2008028658 | 2/2008 |
| JP | 2010074363 | 4/2010 |
| JP | 2010524271 | 7/2010 |
| JP | 2010287951 | 12/2010 |
| WO | WO2008129858 | 10/2008 |
| WO | WO2009144798 | 12/2009 |
| WO | 2011-037358 A2 | 3/2011 |

OTHER PUBLICATIONS

Dbus-send—Send a message to a message bus; 21:43:23 GMT, Aug. 20, 2006, Philip Blundell.*
D-Bus integration in Emacs, Copyright © 2007-2014 Free Software Foundation, Inc. (Year: 2007).*

* cited by examiner

METHOD AND APPARATUS FOR REMOTELY TUNING CHANNELS USING DLNA DMS SERVICE

CROSS REFERENCE TO RELATED APPLICATIONS

This application is the national stage entry under 35 U.S.C. § 371 of International Application PCT/US2012/020,021, filed 3 Jan. 2012, which was published in accordance with PCT Article 21(2) on 12 Jul. 2012, in English and which claims the benefit of U.S. Provisional Application Ser. No. 61/429,550 filed 4 Jan. 2011.

TECHNICAL FIELD

The present invention relates to performing playback of broadcast programs. More particularly, it relates to methods and apparatus for controlling playback of broadcast programs in a Digital Living Network Alliance (DLNA) environment.

BACKGROUND

Broadcast content service providers and internet service providers continue to find synergies within their respective content delivery systems. However, operations between the broadcast-centric devices and the internet-centric devices remain a problem. For example, traditional remote control devices have no information display. Touch pads and other interactive devices that display text, photos and video clips need a mechanism to cause selected content to be displayed on a higher resolution/function device.

SUMMARY

According to a general aspect, a request to access a broadcast media item is received and broadcast parameters for tuning to the broadcast media item are determined. A command string representative of the broadcast parameters is determined and transmitted in response to the request.

According to another general aspect, a request to access a broadcast media item is transmitted to a media server. A command string is received from the media server and decoded to determine broadcast parameters associated with the broadcast media item. A tuner is controlled in response to the determined broadcast parameters to access the broadcast media item.

According to another general aspect, a system comprises a media server adapted to be connected to a network and a media client to access a broadcast media item. The media server receives a request to access the broadcast media item and determines broadcast parameters for tuning to the broadcast media item. It determines a command string representative of the broadcast parameters and transmits the command string in response to the request. The media client transmits the request to access the broadcast media item to the media server and receives from the media server the command string. It decodes the command string to determine the broadcast parameters associated with the broadcast media item and controls a tuner in response to the determined broadcast parameters to access the broadcast media item.

BRIEF DESCRIPTION OF THE DRAWINGS

In the drawings wherein like reference numerals denote similar components throughout the views.

DETAILED DESCRIPTION

Figure 1:
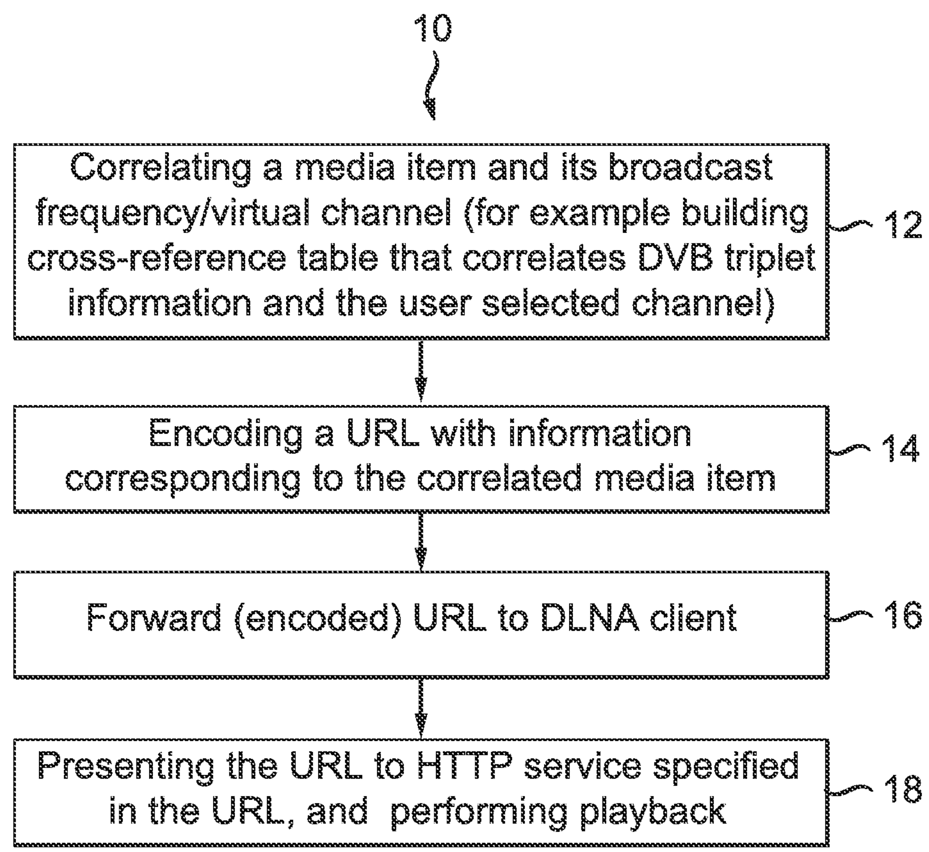
FIG. 1 is a flow diagram showing an exemplary method for enabling DLNA devices to manage the playback of broadcast programs according to an implementation of the invention.

The DLNA Digital Media Service (DMS) specification provides methods for DLNA client devices (also referred to as "DLNA control points" or "DLNA clients") to engage a media renderer to play content through the exchange of a URL and a control interface. Here, the abstraction is that the URL represents a video, photo, or audio asset that exists as a stored filed on some system available in the LAN.

The present principles extend this abstraction to allow rendering of broadcast audio/video streams which are accessed through a tuning device.

The DMS specification provides metadata definitions for EPG (Electronic Program Guide) events, allowing a client to query the DMS for information about times and channels for upcoming broadcast programming. A DMS client wishing to play the program is presented with a URL that can be used to request the program.

However, broadcast programs are generally not streamed to an IP packet network, in preference for transmitting a signal on a specific frequency over terrestrial wiring, satellite transmission, or over the air RF transmission. Each of these transmission methods requires a tuning device, for example, a set top box (STB), that can lock onto the signal to receive the program.

A DMS device wishing to provide a consumer with the ability to view content that is received on a tuning device must translate the program metadata available into the tuning frequency to monitor for the program requested, and present a URL to the DMS consumer that will enable the system to know which frequency to tune to for play the requested program. Note that a given frequency can have multiple programs encoded on it. A program ID, for example, an MPEG-2 program number, can be used to identify a program within a given frequency.

The present principles solve this problem by providing a mechanism that correlates a media item, which has a metadata element containing either a station call sign or channel number for a program, to a specific broadcast frequency and a virtual channel that a service provider broadcasts the program on. This can be done by scanning the frequencies available on the broadcast TV digital connection that comes into the DLNA client device, and correlating that frequency information with the guide information that is published in the digital data stream received from the network operator on the digital connection.

Note that the guide information has user oriented data (for example, program description, station call sign, channel number) and technical data (for example, virtual channel number, MPEG program ID). For example, in a DVB-T system, these data can be broadcast in an MPEG stream at a given frequency, and set into a defined MPEG program ID. Every network operator provisions this information in a somewhat custom manner that they define. A provider can also provision richer information about programming from a database accessible over an IP connection. This information will be of much greater richness than the basic information container sent in an MPEG transport stream over the DVB-T interface.

Since program/channel frequencies are not universal and are specifically assigned by the broadcast providers, the present principles also provide the means for a correlation table to be provisioned in the field, allowing the device to learn its frequency correlation dynamically.

Figure 2:
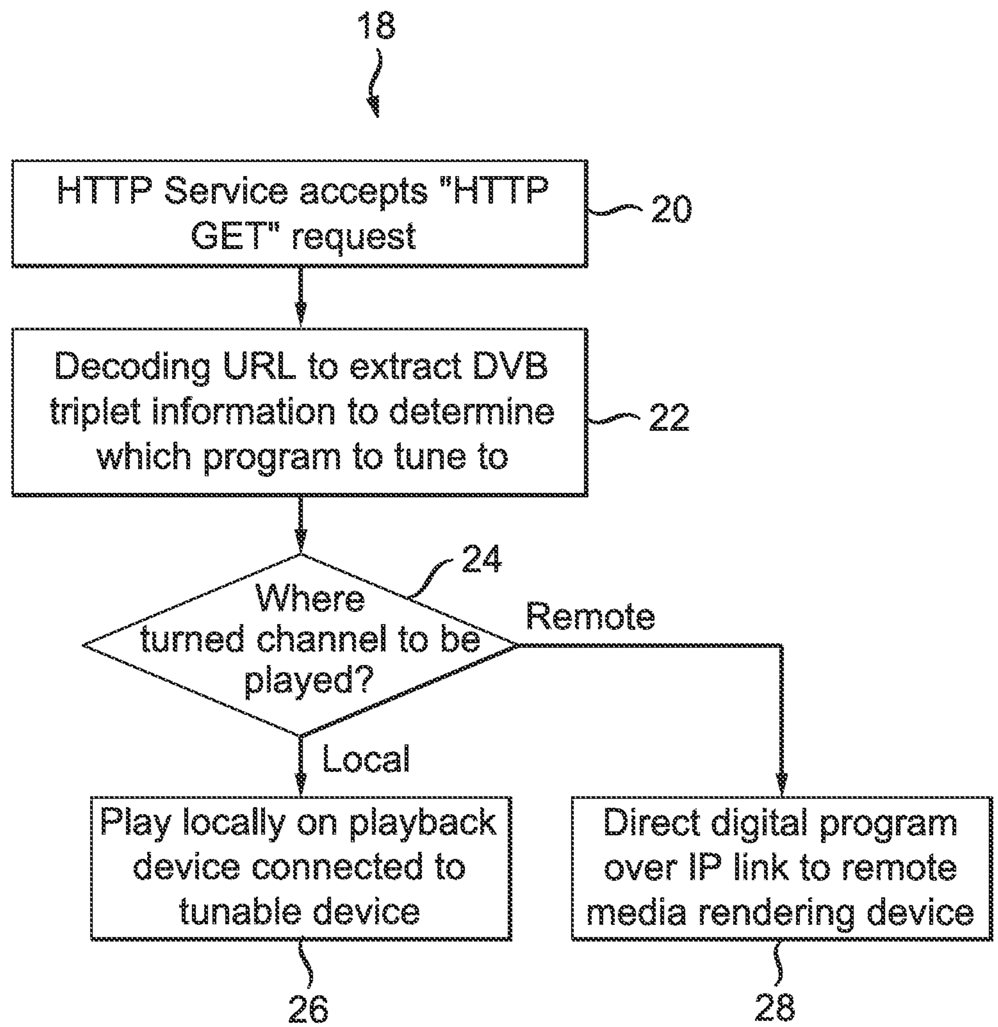
FIG. 2 is a flow diagram showing an exemplary method according to a further implementation of the invention.

FIGS. 1 and 2 illustrate an exemplary method 10 for using DLNA DMS service to control the playback of broadcast programs. Using an MPEG stream as an exemplary data stream and DVB as an exemplary broadcasting system, we discuss how the correlation can be generated dynamically. Note that the method can be easily extended when other data stream formats or broadcasting systems (for example, ATSC, cable networks) are used.

When receiving an MPEG stream, DVB triplets (i.e., original network ID, transport stream ID, and service ID) can be pulled from the MPEG stream along with the physical channel number. This is cross-referenced with a table provisioned for the system that correlates a physical channel to a user's idea of the channel (12).

The metadata that is stored in the content management system (CMS) regarding events (broadcast programs) contains the call sign and virtual channel number. In order for CMS to build the URL it finds the DVB triplet for the virtual channel number from its provisioned table, and generates a URL (14), for example, http://192.168.1.100/MediaPlayer?source=dvb://fff.99dc.1&sink=decode. This information may be packaged in a UPnP DIDL-Lite document that is transmitted to the DLNA client as part of the standard "res" element in the "protocolInfo" property, as illustrated in TABLE 1. To gain a measure of control over the session, the URL may be encoded as a security measure such that clients cannot guess how to select URLs.

TABLE 1

```
<?xml version="1.0" encoding="UTF-8"?>
<DIDL-Lite
xmlns:dc="http://purl.org/dc/elements/1.1/"
xmlns="urn:schemas-upnp-org:metadata-1-0/DIDL-Lite/"
xmlns:upnp="urn:schemas-upnp-org:metadata-1-0/upnp/"
xmlns:xsi="http://www.w3.org/2001/XMLSchema-instance"
xsi:schemaLocation="
urn:schemas-upnp-org:metadata-1-0/DIDL-Lite/
http://www.upnp.org/schemas/av/didl-lite.xsd
urn:schemas-upnp-org:metadata-1-0/upnp/
http://www.upnp.org/schemas/av/upnp.xsd">
<item id="6" parentID="3" restricted="0">
<dc:title>ESPN Sports</dc:title>
<dc:creator>ESPN</dc:creator>
<upnp:class>object.item.videoItem </upnp:class>
<res protocolInfo="stbvideo:*:video/x-ms-wma:*" size="200000">
http://192.168.1.100/MediaPlayer?source=dvb://iff.99dc.1&sink=decode
</res>
<res protocolInfo="httplive:*:video/x-ms-wma:*" size="200000">
http://192.168.1.100/MediaPlayer?source=dvb://iff.99dc.1&sink=
httplive&transcode= VBR_4MBPS_31:720p
</res>
</item>
</DIDL-Lite>
```

For example, the DLNA client may present these "res" element choices to the DLNA digital media rendering (DMR) service it discovers on the STB, and this DMR service indicates that it will accept the stbvideo protocol, so the client presents the http://192.168.1.100/MediaPlayer?source=dvb://fff.99dc.1&sink=decode value to the network for processing, and the program starts playing on the STB because of the plumbing through the HTTP server to the MediaPlayer CGI program which in turn issues a "Dbussend" command for the source/sink parameters.

The DLNA client receives the URL (16) and presents the URL to the HTTP service specified in the URL (18), for example, to a HTTP client or to be decoded locally. Consequently, the playback of the program is performed at its designated playback devices (18). Step 18 is described in further detail in FIG. 2.

Referring to FIG. 2, the HTTP service accepts the "HTTP-Get" request (20). The URL is decoded (22) to extract the frequency and program ID information, for example, DVB triplet information, to determine which program to tune to, and to determine on where the tuned channel is to be played (24).

FIG. 2 illustrates two exemplary choices regarding where to play the broadcast programs. One option is to play the video locally (e.g., protocolInfo="stbvideo . . . ") (26), for example, on the TV connected to the set-top box. Another option is to stream out (28), for example, in http live (e.g., protocolInfo="httplive . . . "). That is, the digital program is directed over IP link to remote media rendering devices.

Assuming a tablet with a video playback function is used as a DLNA control point to request a TV to tune to a given channel, two exemplary use cases, namely playing locally and playing remotely, are explained in the following.

In the first use case, the tablet requests the TV to tune to a channel and the TV plays that channel. Operating as a DLNA control point, the tablet discovers the DLNA DMS service, and the DLNA DMR service on the STB. The tablet requests the DMR to play the content item it finds in the DMS on the STB. The DMR recognizes resource metadata that it uses to engage the media player to tune to the channel identified in the metadata, with rendering of the video occurring on the attached TV screen.

In the second use case, the tablet request to tune to a TV channel and the tablet plays that channel. Operating as a DLNA control point, the tablet discovers the DLNA DMS service. The tablet wants to direct the video to its local screen, and sees in the resource metadata an option to request a stream in a supported network protocol (for example, HTTP, RTSP). The tablet uses the URL encoded for the network protocol it supports and does an HTTP-Get operation with the provided URL. The URL parameters are processed by the HTTP server to send the "Dbussend" command to the media player, which in turn tunes to the requested channel identified in the URL parameters, and output a stream according to the requested protocol.

TABLE 2 is an example of a correlation table built in accordance with the present principles. TABLE 2 illustrates data that correlates a call sign (for example, CSPAN) to a frequency mapping on which the programs for that call sign/channel are broadcast. The information that the device tuner needs to lock on to the channel and select the appropriate virtual channel to decode may be represented by the "Dbussend" locators. In this case, the "Dbussend" locators include the DVB triplet information (for example, ffff.993c.1) that the media player needs in order to tune to a particular channel. Those of skill in the art will appreciate that there are many methods to formulate a command sequence including the broadcast parameters a tuner needs to locate a program, and therefore the present principles are not limited to "Dbussend" locators and they are shown and described here only as an exemplary implementation. For example, a unique string recognized by the DMS which the DMS can map to the locator can be used.

TABLE 2

| Frequency (MHz) | Channel | Virtual Channel | Dbussend Locators | Name |
|---|---|---|---|---|
| 231 | 25-661 | 95 | dvb://ffff.a12.295 | CSPAN |
| 231 | 25-662 | 33 | dvb://ffff.a12.296 | TBSP |
| 231 | 25-663 | 97 | dvb://ffff.a12.297 | HSN |
| 231 | 25-667 | | dvb://ffff.a12.29b | QVC |
| 261 | 30-4 | | dvb://ffff.0.4 | TVGUIDE |
| 525 | 74-441 | 717 | dvb://ffff.233d.1b9 | KVEADT |
| 525 | 74-442 | 710 | dvb://ffff.233d.1ba | KDOCHD |
| 525 | 74-443 | 730 | dvb://ffff.233d.1bb | KPXNDT |
| 555 | 79-501 | | dvb://ffff.a28.1f5 | KJLADT |
| 555 | 79-502 | | dvb://ffff.a28.1f6 | KJLADT8 |
| 555 | 79-503 | | dvb://ffff.a28.1f7 | KXLADT |
| 555 | 79-504 | | dvb://ffff.a28.1f8 | KCET |
| 555 | 79-505 | | dvb://ffff.a28.1f9 | KTTV |
| 555 | 79-506 | 7 | dvb://ffff.a28.1fa | KABC |
| 555 | 79-507 | | dvb://ffff.a28.lfb | KCOP |
| 555 | 79-508 | | dvb://ffff.a28.1fc | KCAL |
| 555 | 79-509 | | dvb://ffff.a28.1fd | KPXN |
| 555 | 79-510 | | dvb://ffff.a28.lfe | KBEH |
| 555 | 79-511 | | dvb://ffff.a28.lff | KVEADT |
| 555 | 79-512 | | dvb://ffff.a28.200 | KCBS |

It is important to note that the frequency/call sign/channel mapping is provisioned by the broadcast provider in the service broadcast through tables that are encoded in the video stream (for example, in an MPEG-2 stream) of a digital broadcast. The present principles reads this mapping information and correlates the "Dbussend" command from the MPEG mapping tables to a broadcast program's metadata, using the call sign or channel number data within the metadata to establish the correct "Dbussend" command to send to the tuner when viewing of the program is desired.

The broadcast provider selects the frequencies and channel/virtual channel that they want to transmit over a given programming channel (for example, ESPN, CSPAN). The "Dbussend Locator" string is algorithmically defined to encode the frequency and physical channel to decode from that frequency, and is presented to the tuner hardware for locking onto and decoding the signal.

Figure 3:
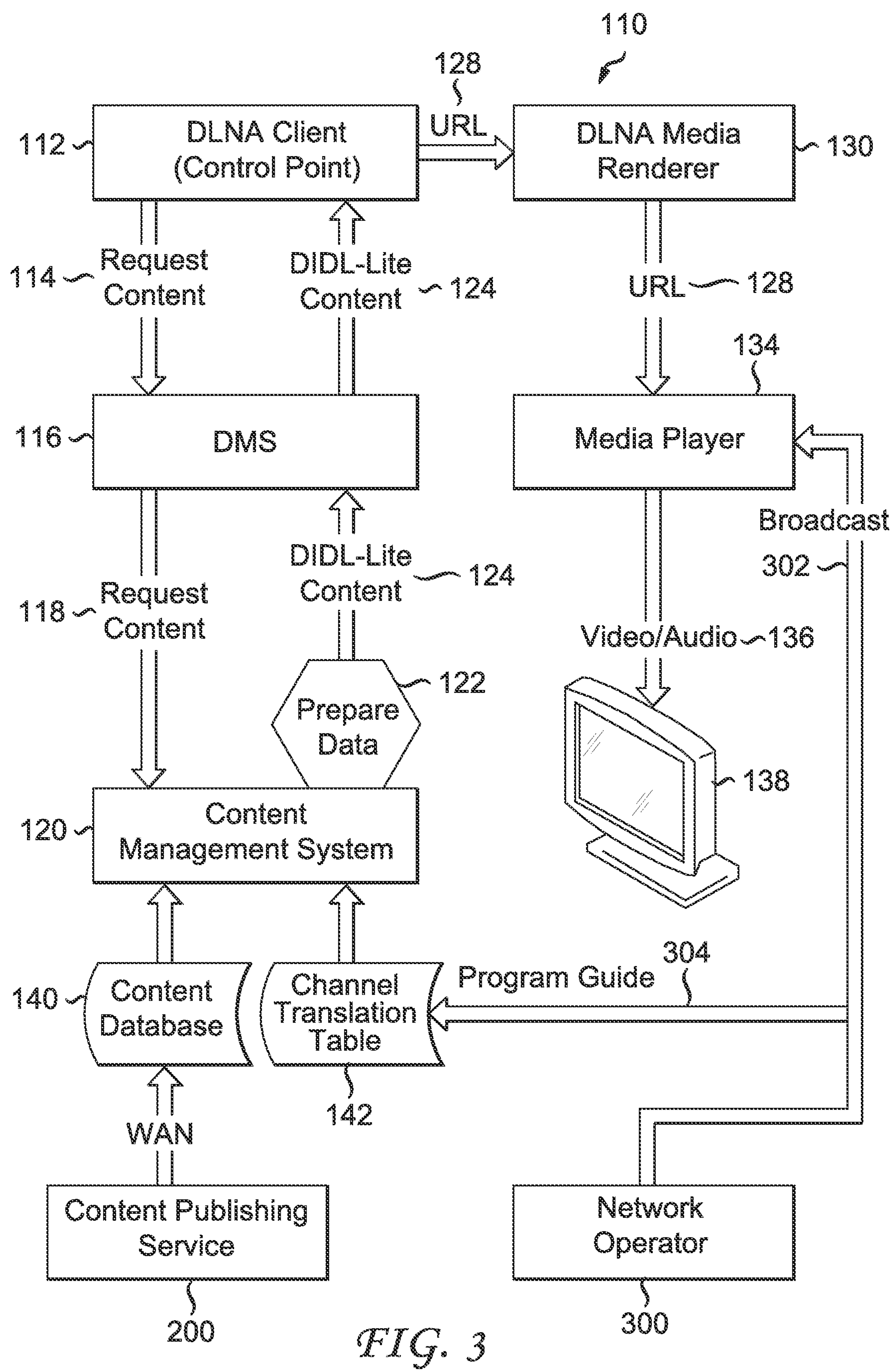
FIG. 3 is block diagram of an exemplary system operating the method of enabling DLNA devices to manage the playback of broadcast programs according to an implementation of the invention.

FIG. 3 illustrates an exemplary system 110 for implementing the present principles. The DLNA client or control point 112 requests (114) content from the DMS 116. As discussed above, the DLNA client can be, for example, tablets, smartphones, portable music players, PCs, etc. The DMS forwards (118) the client's request for content to a content management system 120. The content management system 120 reads its content database 140 with filtering to honor the client's search criteria. The content management system also accesses a channel translation table 142 which utilizes the program guide information 304 from the network operator 300 in seeking to fulfill the client's request.

The content management system 120 then collects the appropriate data and formats/prepares 122 them into a DIDL-Lite Schema (124) (e.g., url:schemas-upnp-org:metadata-1-0/DIDL-Lite/) which is forwarded back to DMS 116 for transmission back to the DLNA client 112.

One aspect of the method of the present principles includes that the channel translation table 142 is referenced for each content item that is to be sent to the requesting client, with the DIDL-Lite "res" element tag being set with a http parameter string that will instruct the media player 134 on which channel to tune to when the client makes a control request to start playing.

Within the DLNA protocol, the URL 128 is presented to the DLNA media renderer 130, which provides a control interface (to provision for volume control, pause, etc.) to the media player 134 which actually implements the tuning and rendering of video/audio on the hardware. The DVB triplet information (i.e., in this example the "Dbussend Locator" string) that is encoded into the URL, passes transparently through the DLNA control point 112 and the DLNA media renderer 130. The media player 134 provides an interface that will accept the encoded URL from the DLNA media renderer 130 and performs the tuning and playing of the requested program by accessing and tuning to the corresponding broadcast 302. Media player 134 passes the video/audio 136 to the playback device 138.

According to one aspect of the invention, the DLNA media renderer 130 is provided as an example of how a request to tune can be presented to a media player from a network attached device. It also acts as an intermediary for presenting status information from the media player 134 to the DLNA control point 112, and for receiving player control commands from the control point which are in turn presented to the media player 138. In this example, the DLNA media renderer 130 can be a software specification that describes a message based API for interfacing with the media player. The DLNA control point 112 communicates with the DLNA media renderer 130 to enable control of rendering an audio/video asset. Other methods and/or implementations as to how to present a request to tune to a particular channel to the media player may be implemented without departing from the scope of the present invention.

Those of skill in the art will appreciate that the media player 134 is used here as an example, and that any media player that is capable of tuning a digital broadcast can be utilized so long as the appropriate interface to set the channel to tune to via the correlated media item/encoded URL. Examples of media players capable of tuning a digital broadcast can be cable set top boxes, satellite received, etc.

It is further contemplated herein that a media player web service may also be utilized with the method of the invention to allow remote clients to configure playback for local or remote rendering. The details of media player web services are well known and understood by those of skill in the art.

In accordance with one implementation, the content management system 120 consumes the program guide information 304 presented by the network operator 300 and merges this information with a more comprehensive information guide published via a content publishing service 200 via a WAN. Due to bandwidth restrictions, the program guide 304 transmitted by the network operator 300 has limited information about a scheduled program. As such, additional information is obtained from content publishing services available on the WAN (e.g., imdb.com), such as review, actors, directors, program teasers that are ingested to provide the consumer with richer information base to view about the programming.

As will be appreciated, these services are not provider specific, and do not contain tuning information for acquiring the broadcast. The content management system 120 ingests the metadata from the publishing service 300, filtering it based on what the network operator 300 provides, so that information about programs that not available through the network operator are eliminated from the data presented to the client in the LAN.

As will be evident from the above, the content management system includes processing capability that enables it to aggregate the sources of information from the various providers, and present a selection of programming content that is available, such that the DLNA client can review the information, make a choice to play it, and the tuning to the selection is engaged through generated encoded URL of the invention. Thus, no external tuning steps are required as a result of this process.

An advantage of the system is that the client does not have to distinguish between broadcast, LAN streamed, WAN streamed, or locally stored content when selecting and making a choice of media program to watch. This resulting simplified user interface for client devices allows for developing one uniform use case as opposed to building various and multiple use cases for viewing and controlling media playback. A user, through a client device and application, can view and play content without regards to its source through these mechanisms.

All examples and conditional language recited herein are intended for pedagogical purposes to aid the read in understanding the principles of the invention and the concepts contributed by the inventor to furthering the art and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be understood that the present principles may be implemented in various forms of hardware, software, firmware, special purpose processors, or a combination thereof. Preferably, the present principles may be implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present principles is programmed. Given the teachings herein, one of ordinary skill in the related art will be able to contemplate these and similar implementations or configurations of the present principles.

While there have been shown, described and pointed out fundamental novel features of the present principles, it will be understood that various omissions, substitutions and changes in the form and details of the methods described and devices illustrated, and in their operation, may be made by those skilled in the art without departing from the spirit of the same. For example, it is expressly intended that all combinations of those elements and/or method steps which perform substantially the same function in substantially the same way to achieve the same results are within the scope of the present principles. Moreover, it should be recognized that structures and/or elements and/or method steps shown and/or described in connection with any disclosed form or implementation of the present principles may be incorporated in any other disclosed, described or suggested form or implementation as a general matter of design choice. It is the intention, therefore, to be limited only as indicated by the scope of the claims appended hereto.

The invention claimed is:

1. A method for controlling a media server connected to a network, comprising:

receiving, from a network operator, first guide information comprising tuning information associated with a plurality of media items;

receiving, from a content publishing service, second guide information associated with at least a media item of the plurality of media items;

transmitting, to a media client device connected to the network, third guide information based on the first guide information and the second guide information;

receiving a request, from the media client device connected to the network, to access a broadcast of a selected media item, wherein the media item is selected from the plurality of media items using the third guide information;

determining broadcast parameters for tuning to the broadcast of the selected media item, wherein the broadcast parameters include a broadcast frequency and a virtual channel number;

determining a command string representative of the broadcast parameters; and transmitting the command string to the media client device, wherein a tuner of the media client device can be controlled to tune to a television channel corresponding to the broadcast parameters represented in the command string.

2. The method according to claim 1, wherein the request includes at least one of a call sign or a channel number associated with a broadcast station.

3. The method according to claim 2, wherein the determining the command string comprises correlating the at least one of the call sign or the channel number with the broadcast parameters using a correlation table stored in the media server.

4. The method according to claim 1, wherein the command string comprises a URL encoded with the broadcast parameters using an encoding algorithm that is known by devices connected to the network.

5. The method according to claim 1, wherein the command string comprises a Dbussend Locator string.

6. A method for controlling a media client device to access a broadcast of a selected media item, comprising:

receiving, from a media server connected to a network, guide information based on first guide information and second guide information, wherein the first guide information is received from a network operator and comprises tuning information associated with a plurality of media items, and the second guide information is received from a content publishing service and is associated with at least a media item of the plurality of media items;

transmitting a request to access the broadcast of the selected media item to the media server connected to a network, wherein the media item is selected from the plurality of media items using the guide information;

receiving from the media server a command string; and decoding the command string to determine broadcast parameters associated with the broadcast of the selected media item, wherein the broadcast parameters include a broadcast frequency and a virtual channel number, wherein a tuner of the media client device can be controlled to tune to a television channel in response to the determined broadcast parameters represented in the command string to access the broadcast of the selected media item.

7. The method according to claim 6, wherein the request includes at least one of a call sign or a channel number associated with a broadcast station.

8. The method according to claim 6, wherein the broadcast parameters are determined using a correlation table stored in the media server.

9. The method according to claim 6, wherein the command string comprises a URL encoded with the broadcast parameters using an encoding algorithm that is known by devices connected to the network.

10. An apparatus, comprising:

a network interface connected to a network; and a media server coupled to the network interface for:

receiving, from a network operator, first guide information comprising tuning information associated with a plurality of media items;

receiving from a content publishing service, second guide information associated with at least a media item of the plurality of media items;

transmitting, to a media client device connected to the network, third guide information based on the first guide information and the second guide information;

receiving a request, from the media client device connected to the network, to access a broadcast of a selected media item, wherein the media item is selected from the plurality of media items using the third guide information;

determining broadcast parameters for tuning to the broadcast of the selected media item, wherein the broadcast parameters include a broadcast frequency and a virtual channel number;

determining a command string representative of the broadcast parameters, and transmitting the command string to the media client device, wherein a tuner of the media client device can be controlled to tune to a television channel corresponding to the broadcast parameters represented in the command string.

11. The apparatus according to claim 10, wherein the request includes at least one of a call sign or a channel number associated with a broadcast station.

12. The apparatus according to claim 11, wherein the media server correlates the at least one of the call sign or the channel number with the broadcast parameters using a correlation table stored in the media server to determine the command string.

13. The apparatus according to claim 10, wherein the command string comprises a URL encoded with the broadcast parameters using an encoding algorithm that is known by devices connected to the network.

14. An apparatus, comprising:

a media client device to access a broadcast of a selected media item including:

a receiver for receiving, from a media server connected to a network, guide information based on first guide information and second guide information, wherein the first guide information is received from a network operator and comprises tuning information associated with a plurality of media items, and the second guide information is received from a content publishing service and is associated with at least a media item of the plurality of media items;

a transmitter for transmitting a request to access the broadcast of the selected media item to the media server connected to a network, wherein the media item is selected from the plurality of media items using the guide information;

the receiver being further configured for receiving from the media server a command string; and a decoder for decoding the command string to determine broadcast parameters associated with the broadcast of the selected media item, wherein the broadcast parameters include a broadcast frequency and a virtual channel number, wherein a tuner of the media client device can be controlled to tune to a television channel in response to the determined broadcast parameters represented in the command string to access the broadcast of the selected media item.

15. The apparatus according to claim 14, wherein the request includes at least one of a call sign or a channel number associated with a broadcast station.

16. The apparatus according to claim 14, wherein the broadcast parameters are determined using a correlation table stored in the media server.

17. The apparatus according to claim 14, wherein the command string comprises a URL encoded with the broadcast parameters using an encoding algorithm that is known by devices connected to the network.

18. A system, comprising:

a media server including:

a first receiver for:

receiving, from a network operator, first guide information comprising tuning information associated with a plurality of media items;

receiving from a content publishing service, second guide information associated with at least a media item of the plurality of media items;

transmitting, to a media client device connected to a network, third guide information based on the first guide information and the second guide information; and receiving a request to access a broadcast of a selected media item, wherein the media item is selected from the plurality of media items using the third guide information;

a processor for determining broadcast parameters for tuning to the broadcast of the selected media item and a command string representative of the broadcast parameters, wherein the broadcast parameters include a broadcast frequency and a virtual channel number; and a first transmitter for transmitting the command string, and a media client device to access the broadcast of the selected media item, including:

a second receiver for receiving, from the media server, the third guide information;

a second transmitter for transmitting the request to access the broadcast of the selected media item to the media server, wherein the media item is selected from the plurality of media items using the third guide information;

the second receiver being further configured for receiving from the media server the command string; and a decoder for decoding the command string to determine the broadcast parameters associated with the broadcast of the selected media item, wherein a tuner of the media client device can be controlled to tune to a television channel corresponding to the determined broadcast parameters represented in the command string to access the broadcast of the selected media item.

19. The system according to claim 18, wherein the request includes at least one of a call sign or a channel number associated with a broadcast station.

20. The system according to claim 18, wherein the broadcast parameters are determined using a correlation table stored in the media server.

* * * * *